United States Patent [19]
Konabe

[11] Patent Number: 6,011,113
[45] Date of Patent: Jan. 4, 2000

[54] METHOD OF MANUFACTURING MODIFIED POLYTETRAFLUOROETHYLKENE FINE POWDER

[75] Inventor: Kazuo Konabe, Shizuoka-Ken, Japan

[73] Assignee: Du Pont Mitsui Fluorochemicals, Tokyo, Japan

[21] Appl. No.: 08/715,297

[22] Filed: Sep. 17, 1996

[30] Foreign Application Priority Data

Sep. 22, 1995 [JP] Japan ................................. 7-244678

[51] Int. Cl.[7] ............................ C08L 27/14; C08L 27/18; C08L 27/20
[52] U.S. Cl. ......................... 524/805; 525/199; 526/247; 526/250; 526/253
[58] Field of Search ............................. 524/805; 526/247, 526/250, 253; 525/199

[56] References Cited

U.S. PATENT DOCUMENTS 4,792,594 12/1988 Gangal et al. ........................ 526/253
5,731,394 3/1998 Treat et al. ........................... 526/247

*Primary Examiner*—James J. Seidleck
*Assistant Examiner*—Olga Asinovsky

[57] ABSTRACT

Polymerization of tetrafluoroethylene is carried out in an aqueous medium to manufacture a type of modified polytetrafluoroethylene fine powder, containing perfluorobutyl ethylene and hexafluoropropylene, with excellent extrusion property under a high reduction ration and with high thermal stability.

5 Claims, No Drawings

METHOD OF MANUFACTURING MODIFIED POLYTETRAFLUOROETHYLKENE FINE POWDER

FIELD OF THE INVENTION

This invention pertains to a method of manufacturing polytetrafluoroethylene (PTFE) fine powder, which has a low extrusion pressure in the paste extrusion molding operation, allows extrusion at a relatively high reduction ratio (RR), and has excellent thermal stability.

BACKGROUND OF THE INVENTION

By adding a small amount of comonomer into PTFE homopolymer, it is possible to modify the PTFE polymer, which does not allow melt molding but allows formation of fibrils, so as to favor paste extrusion. The polymer prepared in this way is called modified PTFE so as to be distinguished from copolymer of tetrafluoroethylene (TFE) which allows melt molding.

For the paste extrusion molding, in order to improve the productivity, the tendency is to increase the RR. RR is represented by the ratio S2:S1, where S1 represents the cross-sectional area at the outlet of the die of the extruder and S2 represents the cross-sectional area of the cylinder that supplies the extrusion powder. Consequently, there is a demand for development of polymers which allow extrusion at higher RR, and which have molding with good appearance and high strength. Usually, as RR is increased, the extrusion pressure rises, and the extruded molding develops a waviness, rough surface, cracks, or breakage. Consequently, it becomes impossible to obtain normal moldings. The reason is believed to be as follows: When PTFE is extruded, the primary grains of PTFE receive shear, leading to the formation of fibrils. At the same time, orientation takes place in the extrusion direction of the primary grains, and friction takes place among grains. The fibril formation and friction appear as the extrusion pressure. Consequently, the extrusion pressure depends on the degree of fibril formation and the friction force. Under a high RR, these are promoted, leading to an increase in the extrusion pressure and poor quality of the molding. In order to improve the extrusion property under high RR, various techniques have been proposed.

In the polymerization method of PTFE disclosed in Japanese Kokoku Patent No. Sho 37 [1962]-4643, before 70% of the prescribed amount of TFE is consumed, a modifier is added into the polymerization system. Examples of the modifiers include hexafluoropropylene (HFP) and other perfluoroalkyltrifluoroethylenes, and methanol and other chain transfer agents. By the addition of a modifier into PTFE, the crystallinity of the polymer can be decreased, and the formation of fibrils can be suppressed. Consequently, the addition of modifier into PTFE can suppress excessive rise of the extrusion pressure, and to alleviate the problem of poor moldings.

The purpose of the method proposed in U.S. Pat. No. 4,792,594 is identical to that in the aforementioned approach disclosed in Japanese Kokoku Pat. No. Sho 37 [1962]-4643. The modifier used in this method is perfluorobutyl ethylene (PFBE). In the method disclosed in Japanese Kokoku Pat. No. Sho 56 [1981]-26242, at the time point when the reaction has been carried out for 70–85%, chlorotrifluoroethylene (CTFE) is added. Due to CTFE, a shell modification is produced for the portion near the surface of the primary grains. Consequently, a lower extrusion pressure is displayed, and the extrusion property at high RR is excellent for the obtained fine powder.

By using the methods disclosed in Japanese Kokoku Pat. No. Sho 37 [1962]-4643 and U.S. Pat. No. 4,792,594, the paste extrusion property of the PTFE fine powder can be improved. However, in order to improve the productivity further, there is a demand for the development of PTFE fine powder that allows molding at even higher RR. For the fine powder prepared according to the method disclosed in Japanese Kokoku Pat. No. Sho 56 [1981]-26242, the extrusion property at high RR is better than that of the fine powders prepared using the aforementioned two methods. However, the fine powder prepared in this method has a high thermal degradation index (TDI), that is, a poor heat resistance. The TDI is an index derived from the difference in density of moldings prepared with different baking times. Larger values of the thermal degradation index correspond to larger differences in density. This indicates that the polymer molecular chains are severed by heat, leading to a decrease in the molecular weight.

The fine powder for high-RR extrusion can be used to form electrical cable coating and fine tubes, which can be used in automobiles, airplanes, precision machines, etc., which require higher quality. In particular, cases of use of the fine powder in manufacturing peripheral parts for engines of automobiles are increasing, and the requirement for heat resistance is very strict for the electrical cables and tubes used in these cases. Consequently, in these fields, there is a demand for the development of fine powder with high heat resistance. For example, the CTFE modified fine powder disclosed in Japanese Kokoku Pat. No. Sho 56 [1981]-26242 exhibits a TDI in the range of 30–50. On the other hand, the modified fine powders disclosed in Japanese Kokoku Pat. No. Sho 37 [1962]-4643 and U.S. Pat. No. 4,792,594 exhibit a TDI in the range of 0–20.

The purpose of this invention is to solve the aforementioned problems of the conventional methods by providing a method of manufacturing PTFE fine powder with high extrusion property at high RR and with excellent thermal stability.

SUMMARY OF THE INVENTION

This invention provides a method of manufacturing modified polytetrafluoroethylene powder by a polymerization reaction comprising copolymerizing tetrafluorethylene with perfluorobutyl ethylene and hexafluoropropylene in an aqueous medium in the presence of a fluorine-containing dispersing agent at a temperature in the range of 10°–90° C. and under an average pressure in the range of 6–30 kg/cm$^2$G, said copolymerizing being carried out by feeding said tetrafluoroethylene to said aqueous medium, feeding said perfluorobutyl ethylene to said aqueous medium in the early stage of the polymerization reaction, feeding said hexafluoropropylene to said aqueous medium after at least 75% of said tetrafluoroethylene to be copolymerized has been consumed in said polymerization reaction, and after completing said polymerization reaction, coagulating the resultant primary grains of said modified polytetrafluoroethylene and drying the resultant coagulum to obtain said modified polytetrafluoroethylene powder, said feeding of said perfluorobutyl ethylene and said hexafluoropropylene being carried out so that said polytetrafluoroethylene powder contains 0.01–0.07 wt % of said perfluorobutyl ethylene and 0.01–0.05 wt % of said hexafluoropropylene, the total amount of said perfluorobutyl ethylene and said hexafluoropropylene present in said polytetrafluoroethylene powder being 0.03–0.08 wt %, based on the weight of tetrafluoroethylene in said powder, the average grain size of said primary grains being in the range of 0.1–0.5 μm, the spheroidicity of said primary grains being 1.5 or lower, and the thermal degradation index of said powder being 20 or lower.

DETAILED DESCRIPTION OF THE INVENTION

According to this invention, it is possible to manufacture a type of fine powder with improved paste extrusion property at high RR, while the thermal stability of PTFE can be maintained. Consequently, by using the fine powder of this invention, it is possible to manufacture the electrical cables used for sensors located in the periphery of the engines of automobiles and airplanes, and to manufacture the tubes used for manufacturing control cables, at a high productivity. Also, the molding manufactured from the fine powder prepared using the method of this invention has high dimensional stability and high mechanical strength.

This invention provides a process for manufacturing of modified polytetrafluoroethylene fine powder with an average grain size of the primary grains in the range of 0.1–0.51 $\mu$m, in which the spheroidicity of the primary grains is 1.5 or lower, and the thermal degradation index is 20 or lower. According to this invention, polymerization of tetrafluoroethylene is carried out in an aqueous medium in the presence of a fluorine-containing dispersing agent at a temperature in the range of 10–90° C. and under an average pressure in the range of 6–30 kg/cm$^2$G. In the initial stage of the reaction, perfluorobutyl ethylene is loaded into the reaction system, and the polymerization is started together with tetrafluoroethylene. After at least 75% of the amount of TFE that should take part in the reaction is consumed, hexafluoropropylene is loaded into the reaction system, and the polymerization is then carried out until all of the amount of TFE that should take part in the reaction is consumed. The primary grains of the modified PTFE obtained in the polymerization are coagulated and dried to obtain the PTFE fine powder. By adjusting the amount of PFBE and the amount of HFP loaded, it is possible to manufacture modified PTFE fine powder with the following features: With respect to the reacted TFE, the amount of PFBE contained is in the range of 0.01–0.07 wt %, the amount of HFP contained is in the range of 0.01–0.05 wt %, and the combined amount of PFBE and HFP contained is in the range of 0.03–0.08 wt %. That is, the primary grains of the modified PTFE obtained using method of this invention are made of a core of PFBE-modified PTFE and a shell of HFP-modified PTFE.

The method of manufacturing this invention is basically the method disclosed in U.S. Pat. No. 2,559,752 by Berry except for the comonomer feeds to the polymerization and for other aspects described hereinafter. More specifically, it is a method of polymerizing TFE and a modifier in an aqueous medium made of water, a reaction initiator and a dispersing agent. Examples of the reaction initiators that can be used include succinoyl peroxide (DSP) and other water-soluble organic peroxides or ammonium persulfate (APS), potassium persulfate and other persulfates. Examples of the dispersing agents that can be used include ammonium perfluorooctanoate, ammonium perfluorononanoate, and other fluoro dispersing agents. The reaction initiators may be used either alone or as a mixture of several types.

The primary grain size can be adjusted by changing the concentration of the dispersing agent. The polymerization is performed under a pressure in the range of 6–30 kg/cm2G by means of autogeneous gas pressurization. Usually, the pressure is maintained constant during the reaction. If the pressure is too low, the reaction rate becomes too slow. On the other hand, when the pressure is too high, the reaction rate becomes too fast, and it becomes difficult to control the temperature. The polymerization temperature is in the range of 10°–90° C. If the temperature is too low, the reaction does not progress. On the other hand, if the temperature is too high, the primary grain size becomes too large. This is undesirable.

PFBE, one of the modifiers used in this invention, may be added all in a single round into the reaction system, added intermittently, or added continuously in the formation of the core of the primary grains of modified PTFE. Anyway, it is important to load it at the initial stage of the reaction. In particular, the method in which PFBE is added all in a single round before the start of the reaction is preferred, as this method can simplify the operation. As PFBE affects the reaction rate, the primary grain size, and the reactivity of HFP, the amount of PFBE added with respect to the weight of TFE that should take part in the reaction should be in the range of 0.01–0.1 wt %. In this case, the content of PFBE with respect to the weight of TFE should be in the range of 0.01–0.07 wt %, or preferably in the range of 0.02–0.07 wt %. If the amount of PFBE added is too large, the reaction rate becomes too low, and the reaction may stop progressing in some cases. Also, the primary grain size becomes too small. In addition, in polymerization of the shell, as the residual PFBE not consumed in the polymerization of the core lowers the reactivity of HFP, it becomes difficult for the polymerization of the shell containing an appropriate amount of HFP. Thus, preferably, the PFBE is either consumed or not present when the copolymerization of TFE with HFP is being carried out.

HFP is introduced into the reaction system at the time when the TFE needed for forming the core is consumed. That is, HFP is introduced at the time point when at least 75% of TFE that should take part in the reaction is consumed. In this case, several approaches may be adopted. In one approach, the feeding of TFE and stirring are ceased at the time point when polymerization of the core is ended, the residual monomer in the system is released (removed), the pressure in the system is decreased to below the vapor pressure of HFP, and HFP is fed into the system. This insures that PFBE is not present when the copolymerization of TFE and HFP is carried out. In another method, HFP is fed into the system without ceasing the feeding of TFE and stirring. As the content of HFP can significantly affect the extrusion property, the amount added with respect to the weight of TFE should be in the range of 0.05–0.75 wt %. In this case, the content of HFP with respect to the weight of reacted TFE is in the range of 0.01–0.05 wt %.

When the reaction proceeds to the point when the polymer concentration becomes 20–50 wt %, the feeding of TFE is stopped, stirring is stopped, and the residual monomer is released to outside the system, and the reaction is ended. Then, the aqueous dispersion of the polymer (referred to as a dispersion hereinafter) is removed from the autoclave, followed by coagulation and drying. The coagulation is carried out by stirring forcibly using a stirrer after water is added to the dispersion until the polymer concentration becomes 10–25 wt %, or when the pH is adjusted to neutral or alkaline in some cases. Drying of the coagulated powder is carried out by using hot air or another means. The preferable drying temperature is in the range of 100 °–200° C. As the drying temperature is increased, the extrusion pressure rises. Consequently, it is preferred that drying be carried out at a low temperature, such as a temperature in the range of 100°–140° C.

The modified PTFE fine powder prepared using the aforementioned method of manufacturing this invention has excellent extrusion property at high RR and high thermal stability, the purpose of this invention. In addition, while the high mechanical strength characteristic of the pure PTFE is maintained, the transparency is better than that of the pure PTFE, and the shrinking rate is smaller. Consequently, the dimensional stability is better, the extrusion property at high RR is excellent, and the high thermal stability characteristic of the pure PTFE can be maintained. If the content of HFP is too small, the transparency and dimensional stability are poor. Also, when the content of HFP is too small, the formation of fibrils takes place excessively, and extrusion at high RR becomes difficult. On the other hand, when the content of HFP is too large, the formation of fibrils becomes insufficient, and high-quality molding cannot be formed. Consequently, with respect to the weight of the reacted TFE, the amount of PFBE contained should be in the range of 0.01–0.07 wt %, or preferably in the range of 0.02–0.07 wt %, and the amount of HFP contained should be in the range of 0.01–0.05 wt %. The total amount of PFBE and HFP combined should be in the range of 0.03–0.08 wt %. As far as the ratio by weight of the core to the shell is concerned, if the proportion of the shell in the overall grain is too large, the paste extrusion pressure becomes higher, and extrusion at high RR becomes inappropriate. On the other hand, when the proportion of the shell is too small, the effect in suppressing the formation of fibrils becomes less significant, and the paste extrusion pressure becomes higher. Consequently, the ratio by weight of the shell to the core should be in the range of 75:25 to 95:5. Also, the thermal degradation index (TDI) should be 20 or smaller, preferably 10 or smaller. For the fine powder meeting these conditions, a high thermal stability is displayed.

The primary grain size and its shape are factors that affect the extrusion pressure. It is believed that, the frictional surface among grains generated by orientation of the primary grains during the aforementioned extrusion operation varies as a function of the primary grain size. That is, as the grain size becomes larger, the friction surface becomes smaller, and the extrusion pressure decreases. However, if the grain size is too large, problems arise when the grains are blended with pigment, and lumps are formed as the grains are blended with the assisting agent. Consequently, the grain size should be in the range of 0.1–0.5 $\mu$m, or preferably in the range of 0.15–0.3 $\mu$m. As the shape of the primary grains approaches being spherical, the friction force when the primary grains are oriented is promoted. Consequently, the spheroidicity of the primary grains, as defined below, should be 1.5 or smaller.

When the modified PTFE fine powder prepared using the method of manufacturing this invention meeting the aforementioned conditions is subject to paste extrusion under RR of 2500, the bead-shaped extrusion moldings (referred to as beads hereinafter) have an appearance of No. 6 or better. The conditions of the paste extrusion molding and the bead No. will be defined later.

In the following, this invention will be explained in more detail with reference to application examples and comparative examples.

EXAMPLES

The analysis methods and test method for the dispersion PTFE fine powder in this specification are as follows.
Polymer Concentration of the Dispersion The specific gravity of the dispersion at 25° C. is measured using a standard specific gravity meter. The value of the specific gravity is substituted into the following formula to derive the polymer concentration of the dispersion:

$$S=177.421-177.083/D$$

where

S: polymer concentration of the dispersion;

D: specific gravity of the dispersion at 25° C.

Average grain size of the primary grains

The diameter of the grains in the dispersion is determined from the proportion of the incident light with a wavelength of 546 nm that can pass through the sample by using a formula based on light scattering theory. The sample of dispersion is filtered by a piece of gauze, and 5 mL of the filtrate are diluted in a flask by pure water to 500 mL. The diluted solution is used to fill a silica cell with a path length of 1 cm, followed by measurement of the absorbance of light with a wavelength of 546 nm. For the dispersion having grain size in the range of 0. 17–0.26 $\mu$m, the average grain size can be derived using the following formula:

$$\text{Average grain size } (\mu m)=0.272A/(SG\times S/100)+0.065$$

A: absorbance of the sample compared with water;

SG: specific gravity of the sample;

S: % solid content of the sample.

In theory, the average grain size is nearly equal to the weight-average grain size determined by means of ultracentrifuge isolation analysis, and it is in good agreement with the value measured directly for the grains with diameter magnified by 20,000× with an electron microscope.
Spheroidicity of Primary Grains The dispersion is diluted to about 500 times with pure water. Several drops of the dilute dispersion are applied to aluminum foil, followed by drying at about 100° C. The surface of the dried aluminum foil is then observed in a scanning electron microscope, with the micrograph taken with a magnification of about 20,000×. 300 or more grains are selected randomly from the micrograph. For each grain, the major diameter "a" and minor diameter "b" are measured accurately, and the spheroidicity is calculated using the following formula:

$$\text{Spheroidicity}=1/n\times\Sigma(a_i/b_i)(i=1,2,3\ldots n)$$

Standard Specific Gravity (SSG)

12.0 g of dried resin powder are loaded into a 2.85-cm-diameter cylindrical mold. The pressure is gradually increased until the final pressure reaches 350 kg/cm$^2$ after 30 sec, and then this final pressure is maintained for 2 min. The premolding prepared in this way is then baked at 380° C. for 30 min in an air oven, followed by cooling at a rate of 1° C./min to 294° C. After being held at 294° C. for 1 min, the sample is removed from the oven and is cooled to room temperature to form the standard sample. The ratio of the weight of the standard sample in air at 23° C. to the weight of the same volume of water at the same temperature is defined as the standard specific gravity. This standard specific gravity is taken as a scale (measure) of the average molecular weight. Usually, a lower standard specific gravity is correlated with a larger molecular weight.
Thermal Degradation Index (TDI)

A premolding is prepared using the same method as that for the standard sample for SSG measurement. Then, the sample is prepared using the same baking procedure as that for the SSG standard sample, except that baking is carried out at 380° C. for 5 h. The specific gravity of this sample is measured using the same method as for SSG. The measured value is taken as the maximum specific gravity (MSG). Then, the following formula is used to derive TDI:

$$TDI=(MSG-SSG)\times 1,000$$

HFP Content 1.75 g of the sample of dried resin powder are loaded into a 2.85-cm cylindrical mold and are distributed between pieces of aluminum foil. Then, a pressure is applied for 30 sec while the pressure is gradually increased until a final pressure of about 1470 kg/cm², and then the final pressure is maintained for 2 min, forming the sample for measurement. A standard resin sample with known HFP content is also prepared using the same method. These samples are then analyzed by IR absorption spectra, and the following formula is used to derive the HFP content.

$$\text{HFP content (wt \%)}=(A1/A2)\times(AS2/AS1)\times 0.126$$

A1: absorbance of the sample at a wavelength of 10.18 $\mu$m;

A2: absorbance of the sample at a wavelength of 10.7 $\mu$m;

AS1: absorbance of the standard sample at a wavelength of 10.18 $\mu$m;

AS2: absorbance of the standard sample at a wavelength of 10.7 $\mu$m.

PFBE Content

The same sample as that used for determining HFP content is used. The IR spectrum of the sample is analyzed, and the following formula is used to derive the PFBE content:

$$\text{PFBE content (wt \%)}=(Sa/Aa)\times(As/Ss)\times 0.03$$

Sa: area of absorbance peak of the sample near a wavelength of 11.36 $\mu$m;

As: absorbance of the sample at a wavelength of 10.7 $\mu$m;

Ss: area of absorbance peak of the standard sample (with known PFBE content) near a wavelength of 11.36 $\mu$m;

As: absorbance of the standard sample at a wavelength of 10.7 $\mu$m.

Paste Extrusion Pressure 100 g of the polymer powder and 20.8 g of hydrocarbon lubricant (Isopar® E, Exxon) (at RR=1600) or 22.3 g of said hydrocarbon lubricant (at RR=2500) are blended in a polyethylene container, followed by heating for 8 h at the room temperature (23±2° C.). The mixture is then filled in a 30.9-mm-diameter cylinder, and a load of 55 kg is applied by a piston for 1 min. The aforementioned mixture is then taken out from the cylinder, and the aforementioned mixture is pressed in a cylinder (inner diameter of 31.7 mm) equipped with an extrusion die at a ram speed of 18 mm/min, so that the aforementioned mixture is extruded to form beads. In the latter half of the extrusion period, for the portion where the pressure is at equilibrium, the extrusion pressure is divided by the cross-sectional area of the cylinder to give the paste extrusion pressure (kg/cm²). When the extrusion pressure becomes higher than 1000 kg/cm², it is taken as not extrudable. The diameter of the orifice of the die used is 0.79 mm for RR 1600 and 0.63 mm for RR 2500.

Bead No.

The extruded sample obtained in the aforementioned paste extrusion operation is observed visually to obtain the rating. The rating is represented by grades 0–10. Grade 10 represents the best appearance, with the extruded sample continuous and free of waviness. The grade is determined corresponding to the degree of waviness. The smaller the grade, the larger the degree of waviness. When no continuous extruded sample can be formed, it is described as "broken."

Appearance of the Extruded Sample

The extruded sample prepared in the aforementioned paste extrusion is baked in a hot air oven (at 380° C. for 15 min), followed by cooling to room temperature. Then, the smoothness of the surface of the extruded sample is evaluated by touch, and the transparency is evaluated by visual observation. The grades for the evaluation are ⓒ, O, X. Grade ⓒ represents the best, and X represents the worst.

Application Example 1

In a 4-L autoclave made of stainless steel (SUS316) equipped with a stirrer and a jacket for temperature adjustment, 60 g paraffin wax, 1690 mL deionized water, and 0.3 g ammonium perfluorooctanoate were loaded, followed by heating to 80° C., while nitrogen gas was used to replace the air in the system so as to purge the oxygen. Then, the autoclave was evacuated, followed by the addition of 0.4 mL PFBE. Then, TFE was used to raise the internal pressure to 26 kg/cm²G, and the contents were stirred at 110 rpm while the internal temperature was kept at 80° C. Then, 10 mL of aqueous solution prepared by dissolving 750 mg ammonium persulfate (APS) in 300 mL water, and 100 mL of an aqueous solution prepared by dissolving 2.5 g succinoyl peroxide (DSP) in 500 mL water were injected by a pump. 5 min after the start of the reaction, 150 mL of a solution prepared by dissolving 8 g ammonium perfluorooctanoate in 400 mL water were injected at a rate of 3 mL/min. The reaction progressed slowly in the initial stage of the reaction. Then, it continued at an accelerated rate. However, the reaction temperature remained constant at 80° C., and the stirring rate was maintained constant at 110 rpm. TFE was fed continuously while the internal pressure was maintained constant at 26 kg/cm²G. After addition of an initiator, when the amount of TFE consumed in the reaction became 1060 g, the feeding of TFE and stirring were stopped. Up to this point, core polymerization was achieved. Then, the gas in the autoclave was released until the internal pressure became 1.5 kg/cm²G. Then, HFP was added appropriately to raise the internal pressure by 0.3 kg/cm²G. Then, stirring was started again (110 rpm), and TFE was added to raise the internal pressure to 16 kg/cm²G. The temperature was maintained at 80° C. When the pressure became 16 kg/cm²G, 5 mL of the aforementioned APS aqueous solution and 50 mL of the DSP aqueous solution were injected, and the reaction was continued. When 80 g TFE were consumed, the feeding of TFE was stopped, and the reaction was continued until the internal pressure became 10 kg/cm²G. Stirring was stopped. Up to this point, shell polymerization was achieved. Calculation indicated that the amount of TFE consumed in the shell polymerization was 118 g. The gas in the autoclave was released until the pressure reached ambient pressure, and then the autoclave was evacuated. By using nitrogen gas, the pressure was restored to ambient pressure. Then, the contents were removed. The obtained dispersion had a solids content of 36.8%, and the average grain size of the primary grains was 0.21 $\mu$m. In this reaction, injection of HFP was carried out when 90% of the TFE that should take part in the reaction was consumed. The obtained dispersion was diluted with water to a polymer concentration of about 15 wt %, followed by stirring in a coagulation container for coagulation. After water was drained from the polymer, drying was carried out at 140° C. for 16 h. For the fine powder obtained after drying, the contents of PFBE and HFP in the polymer were measured, and they were found to be 0.030 wt % and 0.019 wt %, respectively. Also, SSG of the polymer was found to be 2.175.

Application Examples 2–5

The reactions were carried out in the same way as in Application Example 1, except that the amounts of DSP and APS, the reaction temperature, the amount of PFBE, the addition time point of HFP, and the shell polymerization pressure were changed. These reaction conditions are listed in Tables I and II.

In Application Example 2, the reaction temperature was set at 85° C., and the amount of the reaction initiator was changed a little. The HFP addition time point was selected when 924 g TFE were consumed, that is, when 80% of the TFE that should take part in the reaction was consumed. In the polymerization, when the amount of TFE that should take part in the reaction was consumed, the feeding of TFE and stirring were stopped. Otherwise, the conditions were identical to those in Application Example 1. In Application Example 3, the amount of the initiator added was reduced to 30% of that added in Application Example 1. The addition time point of HFP was when 90% of the TFE that should take part in the reaction was consumed. When the amount of TFE that should take part in the reaction was consumed, the feeding of TFE and stirring were stopped. Otherwise, the conditions were identical to those in Application Example 2. In Application Example 4, the amount of PFBE added was increased to twice that in Application Example 1, and the amount of the initiator added was identical to that in Application Example 1. Otherwise, the conditions were identical to those in Application Example 3. In Application Example 5, the same method as in Application Example 1 was adopted, and the amount of the core polymerization initiator was halved with respect to that in Application Example 1. Tables III and IV list the properties and extrusion property of the PTFE fine powder samples obtained in these application examples.

TABLE I

Core Polymerization for Application Examples

| Appl. Ex. | DSP (ppm) | APS (ppm) | Reaction T (° C.) | Pressure (kg/cm²G) | PFBE Added (mL) | (wt %) |
|---|---|---|---|---|---|---|
| 1 | 250 | 12.5 | 80 | 26 | 0.4 | 0.05 |
| 2 | 255 | 13 | 85 | 26 | 0.4 | 0.05 |
| 3 | 75 | 4 | 85 | 26 | 0.4 | 0.05 |
| 4 | 250 | 12.5 | 85 | 26 | 0.8 | 0.1 |
| 5 | 112 | 5.6 | 80 | 80 | 0.4 | 0.05 |

TABLE II

Shell Polymerization for Application Examples

| Appl. Ex. | DSP (ppm) | APS (ppm) | T (° C.) | Reaction pressure (kg/cm²G) | HFP Amount Added (g) | HFP Add'n point* (wt %) | Disp. conc. (wt %) |
|---|---|---|---|---|---|---|---|
| 1 | 125 | 6.2 | 80 | 16–10 | 2.7 | 0.23 | 90 | 36.8 |
| 2 | 128 | 6.4 | 85 | 16 | 2.7 | 0.29 | 80 | 35.9 |
| 3 | 37 | 1.9 | 85 | 16 | 2.7 | 0.23 | 90 | 36.6 |
| 4 | 125 | 6.2 | 85 | 16 | 2.7 | 0.23 | 90 | 36.8 |
| 5 | 112 | 5.6 | 80 | 16–10 | 2.7 | 0.23 | 90 | 36.8 |

*The proportion of TFE consumed at the addition point of HFP with respect to the prescribed amount of TFE.

TABLE III

PTFE Resin Properties for Application Examples

| Appl. Ex. | Ave. grain size (μm) | Polymer PFBE content (wt %) | Polymer HFP content (wt %) | Total PFBE + HFP (wt %) | SSG | TDI | Spheroidicity |
|---|---|---|---|---|---|---|---|
| 1 | 0.215 | 0.030 | 0.019 | 0.049 | 2.175 | 1 | 1.19 |
| 2 | 0.200 | 0.028 | 0.032 | 0.060 | 2.190 | −4 | 1.27 |
| 3 | 0.202 | 0.028 | 0.018 | 0.046 | 2.155 | 1 | 1.35 |
| 4 | 0.189 | 0.051 | 0.017 | 0.068 | 2.166 | 2 | 1.16 |
| 5 | 0.252 | 0.034 | 0.020 | 0.054 | 2.163 | 4 | 1.32 |

TABLE IV

Paste Extrusion Property for Application Examples

| | RR: 1600 | | RR: 2500 | | Appearance | |
|---|---|---|---|---|---|---|
| Appl. Ex. | Extrusion pressure (kg/cm²) | Bead No. | Extrusion pressure (kg/cm²) | Bead No. | Transparency | Surface smoothness |
| 1 | 582 | 10 | 632 | 10 | ○ | ○ |
| 2 | 570 | 10 | 590 | 10 | ○ | ○ |
| 3 | 570 | 10 | 611 | 10 | ○ | ○ |
| 4 | 646 | 10 | 681 | 10 | ○ | ◎ |
| 5 | 605 | 10 | 668 | 10 | ○ | ◎ |

Paste Extrusion Example

The fine powder obtained in Application Example 1 was used in molding using the following method to form a coated electrical cable and a tube. The heat shrinking rate was found to be 0.10% after heating at 340° C. for 2 hr, and 0.50% after heating at 340° C. for 20 hr. The tensile strength of the tube was found to be 848 kg/cm² at 23° and 41 kg/cm² at 370° C. The measurement methods are as follows.

Electrical Cable Coating Test 1 kg of modified PTFE fine powder and 227 g of Isopar® E (hydrocarbon lubricant) were blended in a Betts' process bottle, followed by curing for 8 h at room temperature (23°±2° C.). The aforementioned mixture was loaded into a cylinder and was pressed under a pressure of 10 kg/cm² for 1 min to form a premolding. The aforementioned premolding was used to coat a 1.02-mm o.d. core (AWG-20/19) using a paste extrusion molder (product of Jennings Co.), followed by baking, forming an electrical cable with a coating thickness of about 0.37 mm. The coated electrical cable was cut to 120-mm-long pieces. For each piece, the coating portions on the two ends were peeled by 10 mm to expose the core. For the 5 pieces prepared above, the length of the remaining coated portion ($L_1$) was measured accurately. The pieces were then heated at 350° C. or 2 h, followed by cooling to room temperature. After cooling, the length of the coated portion ($L_2$) was measured accurately again. Then, the pieces were heated again at 340° C. or 18 h, followed by cooling and then measurement of the length of the coated portion ($L_3$). The following formula was then used to calculate the shrinkage rate of the coated portion of the electrical cable. For each sample, 5 pieces were measured, and the average value was calculated.

Heating shrinkage rate (340° C., 2 hr)=$(L_1-L_2)/L_1 \times 100$

Heating shrinking rate (340° C., 20 hr)=$(L_1-L_3)/L_1 \times 100$

Tensile Strength of the Tube

The premolding prepared in the same way as that for the electrical cable coating test was used to mold a tube with an outer diameter of about 2.2 mm and an inner diameter of about 1.9 mm, followed by baking to form a spaghetti-like tube. The aforementioned tube was cut to pieces with lengths of about 100 mm. Then, the piece of tube was fixed on clamps on a tensile tester (with distance between the clamps of 20 mm), and the set was placed in an oven at 370° C. for 10 min. Then, in the oven, the tube was drawn at a speed of 50 mm/min, and the maximum load was measured in this process. The maximum load was divided by the cross-sectional area of the tube, and the obtained result was taken as the tensile strength at high temperature (in units of $kg/cm^2$). The measurement was done 5 times, and the average value was calculated. Also, the measurements were made at 23° C.

Comparative Examples 1–4

The polymerization operations were carried out in the same way and under the same reaction conditions as in Application Example 1, except that the reaction conditions were changed to those listed in Tables V and VI. The properties and extrusion properties of the obtained PTFE fine powder samples are listed in Tables VII and VIII.

As can be seen from Tables VII and VIII, in Comparative Example 1, as the amount of HFP added is large, the content of HFP is large, and the extrusion pressure becomes low. However, as the formation of fibrils is insufficient, high-quality extrusion molding cannot be formed at RR=2500. In Comparative Example 2, as no HFP is added, excessive formation of fibrils takes place, the extrusion pressure becomes higher than 1000 $kg/cm^2$, and extrusion cannot be carried out. In Comparative Example 3, the time point for adding HFP is too early. Consequently, the proportion of shell becomes too large, the extrusion pressure becomes higher than that in the application example, and high-quality extrusion molding cannot be obtained. In Comparative Example 4, the amount of PFBE added is 10 times that in Application Example 1. Consequently, the content of HFP decreases, and the extrusion pressure rises.

TABLE V

Core Polymerization for Comparative Examples

| Comp. Ex. | DSP (ppm) | APS (ppm) | Reaction T (° C.) | Pressure ($kg/cm^2G$) | PFBE Added (mL) | PFBE Added (wt %) |
|---|---|---|---|---|---|---|
| 1 | 255 | 13 | 85 | 26 | 0.4 | 0.05 |
| 2 | 219 | 10.9 | 80 | 26 | 0.4 | 0.05 |
| 3 | 75 | 4 | 85 | 26 | 0.4 | 0.05 |
| 4 | 224 | 11.2 | 80 | 26 | 4.0 | 0.5 |

TABLE VI

Shell Polymerization for Comparative Examples

| Comp. Ex. | DSP (ppm) | APS (ppm) | T (° C.) | Reaction pressure ($kg/cm^2G$) | HFP Amount Added (g) | HFP Amount Added (wt %) | Add'n point* (wt %) | Disp. conc. (wt %) |
|---|---|---|---|---|---|---|---|---|
| 1 | 128 | 6.4 | 85 | 16 | 10.4 | 0.88 | 80 | 36.5 |
| 2 | 438 | 21.9 | 80 | 16–10 | 0 | 0 | 90 | 36.2 |
| 3 | 37 | 1.9 | 85 | 16 | 2.7 | 0.23 | 70 | 36.0 |
| 4 | 112 | 5.6 | 80 | 16–10 | 2.7 | 0.28 | 90 | 36.7 |

*The proportion of TFE consumed at the addition point of HFP with respect to the prescribed amount of TFE.

TABLE VII

PTFE Resin Properties for Comparative Examples

| Comp. Ex. | Ave. grain size ($\mu m$) | Polymer PFBE content (wt %) | Polymer HFP content (wt %) | Total PFBE + HFP (wt %) | SSG | TDI | Spheroid-icity |
|---|---|---|---|---|---|---|---|
| 1 | 0.182 | 0.028 | 0.099 | 0.127 | 2.193 | −4 | |
| 2 | 0.219 | 0.040 | 0 | 0.040 | 2.167 | 14 | 1.26 |
| 3 | 0.212 | 0.048 | 0.041 | 0.089 | 2.162 | 5 | 1.26 |
| 4 | 0.202 | 0.239 | 0.004 | 0.243 | 2.152 | 19 | 1.15 |

TABLE VIII

Paste Extrusion Property for Comparative Examples

| Comp. Ex. | RR: 1600 Extrusion pressure ($kg/cm^2$) | RR: 1600 Bead No. | RR: 2500 Extrusion pressure ($kg/cm^2$) | RR: 2500 Bead No. | Appearance Trans-parency | Appearance Surface smoothness |
|---|---|---|---|---|---|---|
| 1 | 467 | 10 | 295 | 3 | ○ | X |
| 2 | NE | | NE | NA | NA | NA |
| 3 | 848 | 6 | NE | NA | NA | NA |
| 4 | 886 | 10 | NE | NA | NA | NA |

NE: Not extrudable.
NA: As extrusion cannot be carried out at RR = 2500, no measurement value is given.

What is claimed is:

1. A method of manufacturing modified polytetrafluoroethylene powder by a polymerization reaction comprising copolymerizing tetrafluoroethylene with perfluorobutyl ethylene and hexafluoropropylene in an aqueous medium in the presence of a fluorine-containing dispersing agent at a temperature in the range of 10°–90° C. and under an average pressure in the range of 6–30 kg/cm$^2$G, said copolymerizing being carried out by feeding said tetrafluoroethylene to said aqueous medium, feeding said perfluorobutyl ethylene to said aqueous medium in the early stage of the polymerization reaction, feeding said hexafluoropropylene to said aqueous medium after at least 75% of said tetrafluoroethylene to be copolymerized has been consumed in said polymerization reaction, and after completing said polymerization reaction, coagulating the resultant primary grains of said modified polytetrafluoroethylene and drying the resultant coagulum to obtain said modified polytetrafluoroethylene powder, said feeding of said perfluorobutyl ethylene and said hexafluoropropylene being carried out so that said polytetrafluoroethylene powder contains 0.01–0.07 wt % of said perfluorobutyl ethylene and 0.01–0.05 wt % of said hexafluoropropylene, the total amount of said perfluorobutyl ethylene and said hexafluoropropylene present in said polytetrafluoroethylene powder being 0.03–0.08 wt %, based on the weight of tetrafluoroethylene in said powder, the average grain size of said primary grains being in the range of 0.1–0.5 μm, the spheroidicity of said primary grains being 1.5 or lower, and the thermal degradation index of said powder being 20 or lower.

2. The method of manufacturing modified polytetrafluoroethylene fine powder described in claim 1, wherein the amount of perfluorobutyl ethylene fed to said aqueous medium is in the range of 0.01–0.1 wt % with respect to the amount of copolymerized tetrafluoroethylene, and the amount of hexafluoropropylene fed to said aqueous medium is in the range of 0.05–0.75 wt % with respect to the amount of copolymerized tetrafluoroethylene.

3. The method of claim 1 wherein said feeding of hexafluoropropylene to said aqueous medium is begun after the perfluorobutyl ethylene fed to said aqueous medium is consumed in said polymerization reaction.

4. The method of claim 1 comprising stopping said polymerization reaction prior to copolymerizing said hexafluoropropylene with said tetrafluoroethylene, said stopping including the step of removing any of said perfluorobutyl ethylene and said tetrafluoroethylene that has not been consumed in said polymerization reaction and thereafter carrying out said copolymerizing of said hexafluoropropylene with said tetrafluoroethylene.

5. The method of claim 1 wherein said feeding of said perfluorobutyl ethylene and said hexafluoropropylene to said aqueous medium is effective whereby said polytetrafluoroethylene powder is paste extrudable at a reduction ratio of 2500:1 to form a continuous smooth beading which is free of surface waviness.

* * * * *